May 12, 1959  H. J. WHITE  2,886,366
BAND ASSEMBLY
Filed Nov. 8, 1954
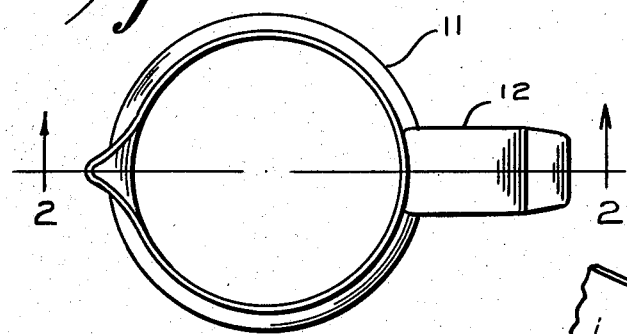
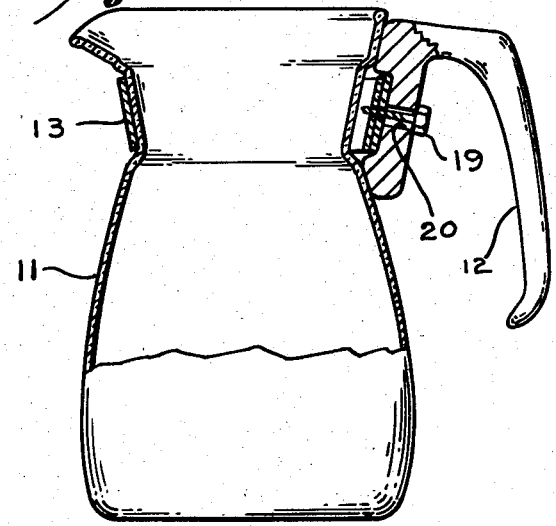
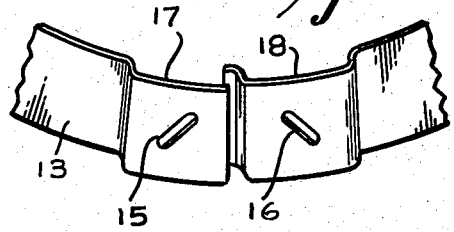
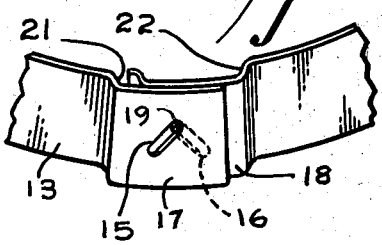
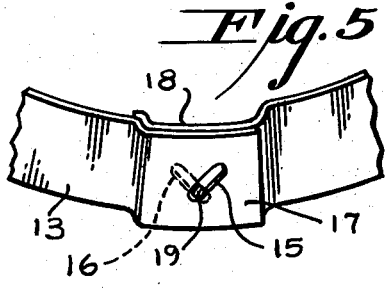
INVENTOR.
HARVEY J. WHITE
BY Clarence R. Patty Jr.
ATTORNEY United States Patent Office 2,886,366
Patented May 12, 1959

2,886,366

BAND ASSEMBLY

Harvey J. White, Corning, N.Y., assignor to Corning Glass Works, Corning, N.Y., a corporation of New York Application November 8, 1954, Serial No. 467,324

6 Claims. (Cl. 294—31.2)

The present invention relates to a band assembly having general utility but being particularly adapted for use in securely and tightly attaching a handle member to a shaped glass article such as a culinary utensil or vessel surrounded by a band.

In the manufacture of most articles, particularly glassware, it is necessary, as a practical matter, to contend with dimensional tolerances, that is, size limits within which an article may vary and still be acceptable. It becomes highly desirable then, in attaching a handle or other accessory to such an article, to provide a means of varying the effective length of the attaching member so that the band may be tightly clamped to any article of a size within the permissible manufacturing tolerance range. Otherwise, at least some of the articles will have a relatively loose and insecure attachment, a condition particularly undesirable on cookingware and serving vessels.

Accordingly a purpose of the invention is to provide a band which can be varied in its effective or assembled length within predetermined limits. A further object is to provide a handle and band assembly for utensils and the like which includes a band encircling the ware and capable of being tightly and securely attached thereto despite permissible variations in ware dimensions.

In the accompanying drawing, Fig. 1 is a top plan view of a vessel assembly embodying the invention.

Fig. 2 is a sectional view taken along line 2—2 of Fig. 1.

Figs. 3, 4, and 5 are fragmentary views of a band illustrating the invention.

The vessel assembly, illustrated in Figs. 1 and 2 consists primarily of a vessell 11, a handle 12, and a band 13. The vessel 11 preferably has a surrounding groove or channel 14 formed in its side wall and adapted to receive the band 13. It is further preferred that groove 14 be of substantially the same width as band 13, thus effectively restraining band 13 from lateral movement or displacement along the vessel wall.

Band 13 is shown in expanded or open form in Fig. 3 and in closed or assembled form in Figs. 4 and 5. Spaced a short distance from each end of the band, preferably equidistant therefrom, are elongated, oppositely-inclined slots 15 and 16. Conveniently the angles of inclination are substantially the same, the preferred angle of inclination being about 45°. In assembling band 13 about an article such as vessel 11, the end portions 17 and 18 of band 13 are brought together in overlapping relation as shown in Figs. 4 and 5 with slots 15 and 16 crossing each other to form a smaller opening, common to both end portions, through which a holding member 19 is inserted to maintain the end portions of the band in assembled relation. While any conventional holding member may be employed, a self-threading metal screw, as shown, is preferred since the threads of such screw will engage the band at the edges of the slots and distort such engaged portions along the thread lines, thus providing supplementary locking of the band ends against movement.

As indicated in Figs. 4 and 5 the common opening formed by the crossed slots 15 and 16 (shown occupied by holding member 19) moves along a vertical line as band ends 17 and 18 are moved horizontally with respect to each other. However, the substantially symmetrical form of the opening is retained effectively unchanged during such movement, the opening being in the nature of a square when the slots are inclined at the preferred 45° angle. Accordingly, holding member 19 may be inserted, and the band ends clamped or locked, at either of the limiting positions shown in Figs. 4 and 5 or at any intermediate point. It is apparent then that the maximum dimensional variation provided by the band assembly is the difference between these limits. Conveniently, this maximum dimensional variation in the band assembly may be equated to the dimensional tolerances established for the vessel or other article which the band assembly is used with.

In attaching handle member 12 to vessel 11, band 13 is placed in channel 14 encircling the vessel, end portions 17 and 18 overlapped as shown in Fig. 2, and holding member 19 passed through an opening 20 in the handle and then through the common opening in the overlapped end portions of the band. As previously noted, the opening may vary in its vertical location with respect to the vessel wall, depending upon the circumferential dimension of vessel 11 in channel 14. Therefore, if handle 12 must assume a predetermined vertical relation to the vessel wall it is essential that opening 20 be in the form of a vertical slot in handle 12 in order to insure alignment of the openings for assembly. Where handle member 12 need not be attached in a particular vertical relation to the vessel wall, then the handle member itself may be displaced vertically to effect alignment of the openings and the need for a vertical slot in the handle obviated.

For ease in assembling band 13 and bringing its end portions in overlapping relation with the band tightly engaging the vessel wall, it is convenient to provide outwardly bent portions 21 and 22 on the band, such outwardly bent portions being substantially perpendicular to the central, wall-engaging, portion of the band and also to the end portion. Outwardly bent portions 21 and 22 provide, in effect, shoulders which may be easily grasped in clamping jaws or other suitable assembly devices while handle member 12 and holding member 19 are fixed in assembled relation with the band. Band portions 21 and 22 also serve to space the end portions 17 and 18 from the vessel surface and allow for holding member 19 to protrude through without striking the vessel wall.

While the invention has been described with relation to attachment of a handle member to a vessel wall, it will be appreciated that it is equally applicable to attaching any other desired member, and further may be used on other shaped articles whether made of glass or not and regardless of their use.

What is claimed is:

1. A band assembly comprising an elongated, flexible band having oppositely inclined, elongated slots spaced inwardly from and adjacent to each end of the band, said slots being so arranged as to cross each other when the ends are placed in overlapping relation thereby forming a common opening for reception of a transverse holding member and a threaded holding member extending through the common opening with threads engaging and distorting the end portions of the band at the edges of the slots to lock the ends in fixed relation to one another.

2. A band assembly for use in conjunction with an article having a shallow channel about its surface, such assembly including a substantially flat band of flexible material adapted to be retained in said channel and having oppositely inclined, elongated slots spaced inwardly from and adjacent to each end of the band, said slots being so arranged as to cross each other when the band ends are placed in overlapping relation thereby providing a common opening for reception of a transverse holding member and a threaded holding member extending through the common opening with threads engaging and distorting the end portions of the band at the edges of the slots to lock the ends in fixed relation to one another.

3. A handle and band assembly suitable for encircling a container and including a band having end portions arranged in overlapping relation, said end portions having oppositely inclined, elongated slots crossing one another to form a common opening through the end portions, and an element traversing said slots and engaging each end portion of the band to fixedly hold said band ends with respect to one another after said band has been tightly encircled about a container and a handle having a passage therethrough also traversed by said element, whereby the handle and band are clamped to one another.

4. A handle and band assembly for a utensil including a band encircling the utensil and having overlapped end portions each of which has an oppositely inclined, elongated slot so arranged that such slots cross to form a smaller opening adapted to receive a transverse holding member, said band further having outwardly bent portions adjoining the overlapping end portions and spacing said end portions from the utensil wall, such outwardly bent portions forming shoulders adapted for engagement by clamping means during assembly, a handle member having a portion arranged adjacent to the crossed end portions of the band, said handle portion having a vertical slot in alignment with the opening formed by the crossed slots of the band and a holding member which passes transversely through the handle slot and the opening formed by the crossed slots in the band and engages the handle as well as the end portions of the band to hold said handle and end portions in fixed relation to one another.

5. A handle and band assembly for a utensil including a band encircling the utensil and having overlapped end portions each of which has an oppositely inclined, elongated slot so arranged that such slots cross to form a smaller opening adapted to receive a transverse holding member, said band further having outwardly bent portions adjoining the overlapping end portions and spacing said end portions from the utensil wall, such outwardly bent portions forming shoulders adapted for engagement by clamping means during assembly, a handle member having a surface adapted to engage the utensil wall, said wall engaging surface being composed of upper and lower segments separated by a channel in the handle member within which the overlapping end portions of the band are received, said handle member further having a transverse opening in alignment with the opening formed by the crossed slots of the band, and a holding member passing transversely through the handle opening and the opening formed by the crossed slots of the band, whereby the assembled components are maintained in fixed relationship to one another with the end portions of the band spaced outwardly from the utensil wall.

6. A vessel having a circumferential channel formed in its side wall, a flat band of flexible material positioned within said channel and having a width substantially equal thereto so that the band is restrained against lateral displacement by the channel walls, said band having overlapping end portions substantially parallel to, but spaced outwardly from, the utensil wall by intermediate portions of the band which extend outwardly in a substantially perpendicular direction, the overlapping end portions of the band having oppositely inclined, elongated slots so arranged that they cross to form a smaller opening for receiving a transverse holding member, a handle member having a surface adapted to engage the vessel wall on opposite sides of the circumferential channel, said wall engaging surface having a channel formed therein to receive the overlapping end portions of the band, the handle member having a vertical slot in alignment with the opening formed by the crossed slots of the band and a holding member passing transversely through the handle slot and the opening formed by the crossed slots of the band, whereby the assembled components are maintained in fixed relationship to one another with the handle being held tightly against the vessel wall in a predetermined position.

References Cited in the file of this patent

UNITED STATES PATENTS

| 2,325,841 | Faber | Aug. 3, 1943 |
| 2,453,254 | Odin | Nov. 9, 1948 |
| 2,495,688 | Blakeslee | Jan. 31, 1950 |
| 2,616,644 | Christophersen | Nov. 4, 1952 |
| 2,686,072 | Van Guilder | Aug. 10, 1954 |